UNITED STATES PATENT OFFICE.

JOHN N. BACHMAN, OF SLATINGTON, AND MORRIS L. BACHMAN, OF WALNUTPORT, PENNSYLVANIA.

COMPOSITION OF MATTER FOR CLEANING OR POLISHING BLACKBOARDS OR THE LIKE.

1,223,846.     Specification of Letters Patent.     Patented Apr. 24, 1917.

No Drawing.     Application filed February 15, 1915. Serial No. 8,322.

*To all whom it may concern:*

Be it known that we, JOHN N. BACHMAN and MORRIS L. BACHMAN, citizens of the United States, residing at Slatington and Walnutport, respectively, in the counties of Lehigh and Northampton and State of Pennsylvania, have invented certain new and useful Improvements in Compositions of Matter for Cleaning or Polishing Blackboards or the like, of which the following is a specification.

Our invention relates to a composition of matter for treating slate slabs, black boards, marble, granite, glass, etc., to clean and polish the same, and removing scratches or scars therefrom, in a highly expeditious and convenient manner.

An important object of the invention is to provide a composition of the above mentioned character, which is inexpensive to manufacture, and highly efficient and economical in use.

Other objects and advantages of the invention will be apparent during the course of the following description.

In the production of our composition of matter, we heat to the boiling point and melt one pound of sulfur and dissolve therein the following ingredients preferably in the order stated:

1 ounce bees-wax,
    4 ounces rosin,
    4 " pitch,
    2 " refined asphaltum,
    25 " orange shellac.

These ingredients retained at the boiling point and after they are thoroughly dissolved to form a homogeneous more or less plastic mass, we add the following ingredients preferably in the order stated:

2½ pounds of powdered crystolon,
    2½ " of powdered carborundum,
    1 lb. of powdered slate or slate dust.

The mass is continuously stirred while these ingredients are added, so that they are properly distributed throughout the same.

The composition which is finally obtained is placed in boxes or molds of suitable size and allowed to cool to form bricks or cakes. When cooled the composition of matter forms a solid substance.

In use, the brick or cake of our composition is rubbed by hand or by machinery in engagement with the slate slabs, black boards, marble or the like to be treated, preferably in the presence of water. It will be found that the composition cleans and polishes the surface of the material being treated, besides smoothing the same and removing scratches or scars. The composition is free from any large particles or grains of hard matter which would injure the surface being treated. The composition is sufficiently hard so that it will not wear away too freely and hence is economical.

It is to be understood that the invention is in no sense restricted to the precise proportions of the ingredients as stated, as these are set forth as illustrating the preferred form of the invention. The proportions of the ingredients may be widely varied as may be found advantageous. It is also desired not to restrict the invention to the inclusion of all of the elements or ingredients, as satisfactory results are obtainable by omitting certain of them.

Having thus described the invention, we claim:

1. A composition of matter, comprising rosin, shellac, a wax, and finely divided mineral material.

2. A composition of matter, comprising sulfur, shellac, pitch asphaltum, rosin, crystolon, carborundum, and slate dust.

3. A composition of matter, comprising rosin, pitch asphaltum, shellac, and carborundum.

4. A composition of matter, comprising shellac, pitch asphaltum, powdered carborundum, and crystolon.

5. A composition of matter of the character described, comprising sulfur, wax, rosin, pitch, asphaltum, shellac, powdered crystolon, powdered carborundum, and powdered slate.

6. A composition of matter, comprising powdered crystolon, powdered slate, powdered carborundum, sulfur, wax, rosin, and pitch asphaltum.

In testimony whereof we affix our signatures in presence of two witnesses.

JOHN N. BACHMAN.
         MORRIS L. BACHMAN.

Witnesses:
    GEO. J. A. MILLER,
    CHAS. D. PETERS.